(No Model.)

P. MICHELETTI.
BUOY ATTACHMENT FOR VESSELS.

No. 338,859. Patented Mar. 30, 1886.

Witnesses,
J. H. Towne
H. E. Lee

Inventor,
P. Micheletti
By Dewey & Co.
Attorneys

N. PETERS, Photo-Lithographer, Washington, D. C.

UNITED STATES PATENT OFFICE.

PIETRO MICHELETTI, OF SAN FRANCISCO, CALIFORNIA.

BUOY ATTACHMENT FOR VESSELS.

SPECIFICATION forming part of Letters Patent No. 338,859, dated March 30, 1886.

Application filed July 11, 1885. Serial No. 171,390. (No model.)

*To all whom it may concern:*

Be it known that I, PIETRO MICHELETTI, of the city and county of San Francisco, and State of California, have invented an Improvement in Buoy Attachments for Vessels; and I hereby declare the following to be a full, clear, and exact description thereof.

My invention relates to the class of ship or vessel attachments; and my invention consists in a buoy or float connected by a loosely-paying line of suitable length with the ship or vessel, and seated loosely in a chamber or pocket, from which it can be floated by the action of the waters; and it further consists in details of construction relating to the construction of and attachments to the buoy or float, and to its connection with the vessel, all of which I shall hereinafter fully explain.

My invention has various objects. The principal one is to indicate the fact that a vessel has sunk, and its location. Another is to provide for the saving of life, and still another is to provide easy access to the sunken vessel and a means for getting ready appliances for raising her.

Figure 1:
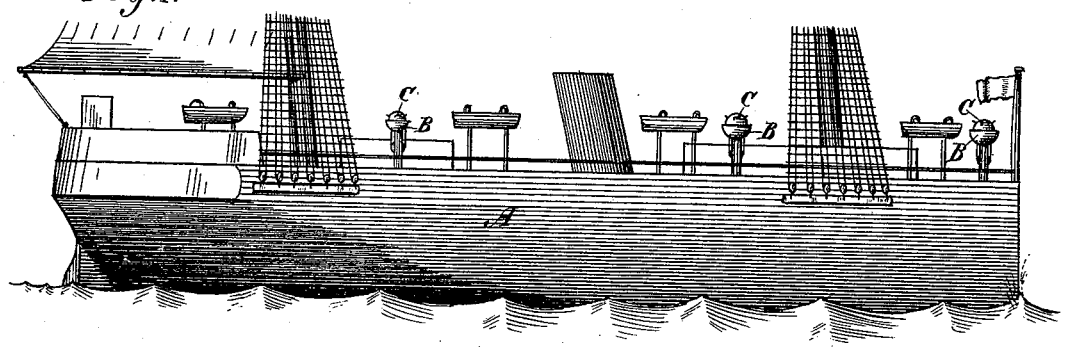
Figure 3:
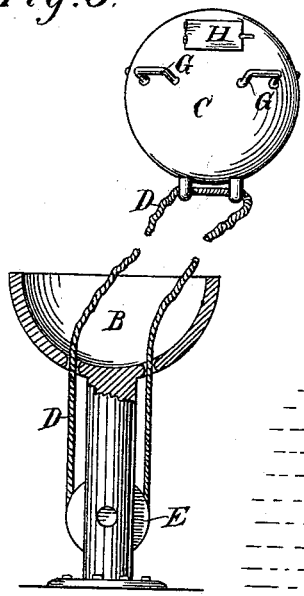
Figure 2:
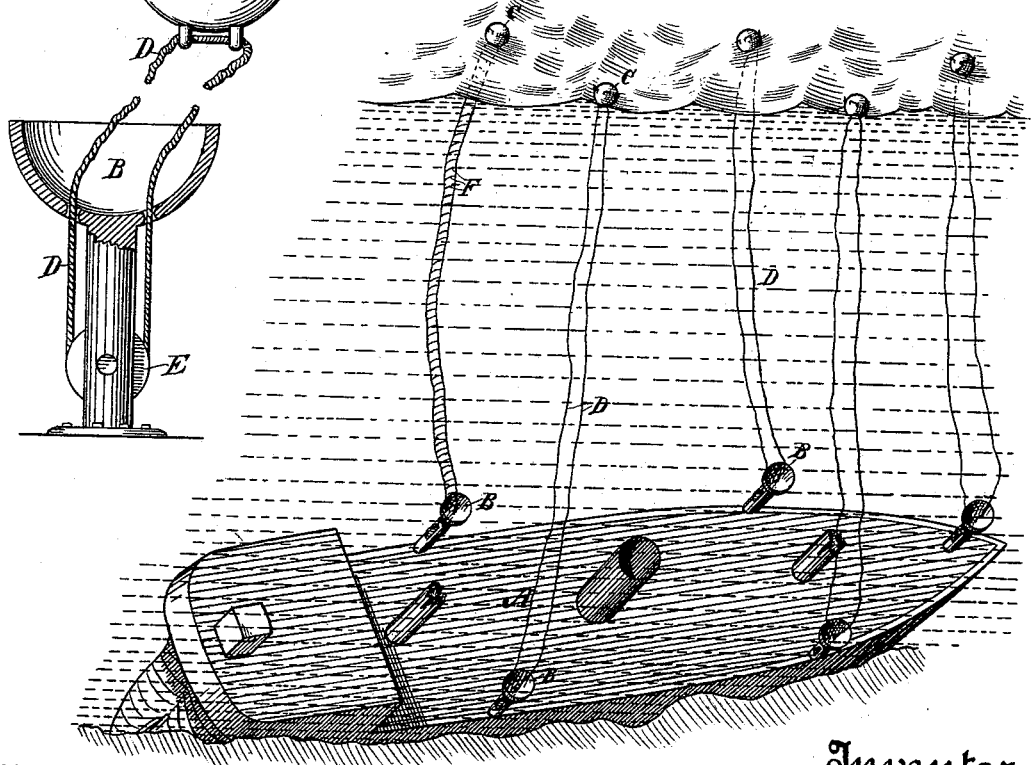

Referring to the accompanying drawings, Figure 1 is a perspective view of a vessel on the surface of the water and carrying the attachments. Fig. 2 is a view of same when sunk, showing the floating buoys. Fig. 3 is a detail of the buoy and the pocket.

A is a ship or vessel. She is provided in suitable locations with open receptacles or pockets B, in which lie loosely the buoys or floats C. These are connected with the vessel by means of loosely-paying lines, chains, or cables D. Though these lines may be connected with the vessel at any suitable points, I prefer to attach them in the vicinity of the pockets, and make them pass through them, as shown, so that the floats may have proper guidance to their seats.

The general operation of my invention is as follows: When the ship is sinking the rising waters float the buoys from their seats or receptacles, and they remain on the surface, though anchored to the vessel by means of their connecting-lines. The length of the lines should be such as not to drag them under. They thus serve as a notice of the sunken vessel and its location. By painting them in conspicuous colors the notice will be the more distinct. Though they may be attached to the vessel by a single line, I prefer connecting them by an endless double line, such as shown. This line passes around suitable sheaves or guides, E, below, and also passes loosely through the buoy, so that it may be made to travel, whereby chains and other apparatus for raising may be attached to it and properly directed down to the vessel for use by the divers.

I may provide the double line with cross-ropes F, as shown in one instance in Fig. 2, whereby a ladder is formed for ascent and descent. I would also paint the ship's name on the buoys.

In order to save life I provide the buoys with handles G, and for the same purpose I construct them with chambers H, for containing food necessary to life. Thus, when the vessel sinks, if any person remains on or rises to the surface, he may cling to the buoys and find sustenance until rescued.

Having thus described my invention, what I claim as new, and desire to secure by Letters Patent, is—

An attachment for a ship or vessel, consisting of the combination of the float or buoy, the pocket in which the float rests, a loosely-paying double line connecting the said float or buoy with the vessel, and the cross-ropes F, forming a ladder of the double line, substantially as herein described.

In witness whereof I have hereunto set my hand.

PIETRO MICHELETTI.

Witnesses:
C. D. COLE,
J. H. BLOOD.